(12) United States Patent
Kung et al.

(10) Patent No.: US 12,301,116 B2
(45) Date of Patent: May 13, 2025

(54) VOLTAGE REGULATOR WITH DYNAMIC VOLTAGE AND FREQUENCY TRACKING

(71) Applicant: MediaTek Singapore Pte. Ltd., Singapore (SG)

(72) Inventors: Nien-Hui Kung, San Jose, CA (US); Chia-Hua Chou, Hsinchu (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 233 days.

(21) Appl. No.: 18/057,311

(22) Filed: Nov. 21, 2022

(65) Prior Publication Data

US 2023/0231482 A1 Jul. 20, 2023

Related U.S. Application Data

(60) Provisional application No. 63/343,581, filed on May 19, 2022, provisional application No. 63/300,078, filed on Jan. 17, 2022.

(51) Int. Cl.
*H02M 3/335* (2006.01)

(52) U.S. Cl.
CPC .............................. *H02M 3/33507* (2013.01)

(58) Field of Classification Search
CPC ..... G05F 1/00; G05F 1/10; G05F 1/12; G05F 1/46; G05F 1/455; G05F 1/45;
(Continued)

(56) References Cited

U.S. PATENT DOCUMENTS 10,033,273 B1 * 7/2018 Chen ..................... H02M 3/156
11,038,423 B2 6/2021 Chen
(Continued)

FOREIGN PATENT DOCUMENTS

CN 109788614 A 5/2019
EP 3 435 507 A1 1/2019
(Continued)

OTHER PUBLICATIONS

Raychowdhury, A., et al.; "A Fully-Digital Phase-Locked Low Dropout Regulator in 32nm CMOS;" 2012 Symposium on VLSI Circuits Digest of Technical Papers; Jun. 2012I pp. 148-149.
Extended European Search Report dated May 25, 2023, issued in application No. EP 23151130.4.
Chinese language office action dated Feb. 22, 2024, issued in application No. TW 112101674.
(Continued)

*Primary Examiner* — Jeffrey A Gblende
(74) *Attorney, Agent, or Firm* — McClure, Qualey & Rodack, LLP

(57) ABSTRACT

A voltage regulator with dynamic voltage and frequency tracking is shown. The voltage regulator has power switches converting an input voltage into an output voltage, a control loop, a voltage comparator, and a target voltage generator. The control loop is coupled to the power switches to control the power switches to perform voltage regulation. The voltage comparator compares the output voltage to the target voltage to generate a first control signal to control the control loop. The target voltage generator generates the target voltage for the voltage comparator based on the frequency difference between the target frequency and the critical-path-related frequency, wherein the critical-path-related frequency depends on the output voltage. The power efficiency and response time are improved.

14 Claims, 3 Drawing Sheets

(58) Field of Classification Search
CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H02M 1/0048; H05B 39/048; B23K 11/24; H04B 2215/069

See application file for complete search history.

(56) References Cited

U.S. PATENT DOCUMENTS

| | | | |
|---|---|---|---|
| 11,316,428 B2* | 4/2022 | Chang | H03K 5/26 |
| 11,653,434 B2* | 5/2023 | Ichikawa | H05B 47/10 |
| | | | 315/161 |
| 2017/0346406 A1 | 11/2017 | Bucheru et al. | |
| 2020/0220460 A1* | 7/2020 | Dharmalinggam | H02M 3/158 |
| 2020/0275542 A1* | 8/2020 | Ichikawa | H05B 45/46 |
| 2021/0028701 A1 | 1/2021 | Dharmalinggam et al. | |

FOREIGN PATENT DOCUMENTS

| | | |
|---|---|---|
| EP | 3 713 377 A1 | 9/2020 |
| JP | 2008-289106 A | 11/2008 |
| TW | I273764 B | 2/2007 |
| WO | 2016/145646 A1 | 9/2016 |

* cited by examiner

VOLTAGE REGULATOR WITH DYNAMIC VOLTAGE AND FREQUENCY TRACKING

CROSS REFERENCE TO RELATED APPLICATIONS

This application claims the benefit of U.S. Provisional Application No. 63/300,078, filed Jan. 17, 2022, and U.S. Provisional Application No. 63/343,581, filed May 19, 2022, the entirety of which are incorporated by reference herein.

BACKGROUND OF THE INVENTION

Field of the Invention

The present invention relates to voltage regulators.

Description of the Related Art

A voltage regulator may control power switches to convert an input voltage to an output voltage.

How to design a voltage regulator taking power efficiency and response time into consideration is an important issue in this field.

BRIEF SUMMARY OF THE INVENTION

A voltage regulator with dynamic voltage and frequency tracking is shown.

A voltage regulator in accordance with an exemplary embodiment of the preset invention has power switches converting an input voltage into an output voltage, a control loop, a voltage comparator, and a target voltage generator. The control loop is coupled to the power switches to control the power switches to perform voltage regulation. The voltage comparator compares the output voltage to the target voltage to generate a first control signal to control the control loop. The target voltage generator generates the target voltage for the voltage comparator based on the frequency difference between the target frequency and the critical-path-related frequency, wherein the critical-path-related frequency depends on the output voltage. The power efficiency and response time are improved.

In an exemplary embodiment, when the critical-path-related frequency is lower than the target frequency, the target voltage generator increases the target voltage to increase the critical-path-related frequency. When the critical-path-related frequency is higher than the target frequency, the target voltage generator decreases the target voltage to decrease the critical-path-related frequency.

In an exemplary embodiment, the voltage regulator further has a clock generator, which is powered by the output voltage to generate the critical-path-related frequency that depends on the output voltage.

In an exemplary embodiment, the clock generator makes the critical-path-related frequency higher when the output voltage is higher.

In an exemplary embodiment, the target voltage generator has a dynamic voltage scaler, which generates a reference voltage to be adjusted according to the frequency difference between the target frequency and the critical-path-related frequency, and thereby generates the target voltage.

In an exemplary embodiment, the target voltage generator further has a phase frequency detector and a reference voltage adjusting circuit. The phase frequency detector receives the target frequency and the critical-path-related frequency to obtain the frequency difference between the target frequency and the critical-path-related frequency. The reference voltage adjusting circuit is controlled by the frequency difference obtained by the phase frequency detector. The reference voltage adjusting circuit generates a correction voltage for adjusting the reference voltage to the target voltage.

In an exemplary embodiment, the phase frequency detector further generates a second control signal for the control loop based on the frequency difference between the target frequency and the critical-path-related frequency. The second control signal is passed to the control loop without passing through the reference voltage adjusting circuit or the voltage comparator.

In an exemplary embodiment, the digital loop codes of the control loop are adjusted according to the second control signal that is passed to the control loop without passing through the reference voltage adjusting circuit or the voltage comparator.

In an exemplary embodiment, the dynamic voltage scaler is controlled by a target decision module to make the reference voltage match the load driven by the voltage regulator.

In an exemplary embodiment, when controlling the dynamic voltage scaler to make the reference voltage match the load, the target decision module further adjusts the gain that the reference voltage adjusting circuit provides to amplify the frequency difference between the target frequency and the critical-path-related frequency.

In an exemplary embodiment, when controlling the dynamic voltage scaler to make the reference voltage match the load, the target decision module disables the gain that the reference voltage adjusting circuit provides to amplify the frequency difference between the target frequency and the critical-path-related frequency.

In an exemplary embodiment, the target decision module controls the dynamic voltage scaler to make the reference voltage related to the target frequency.

In an exemplary embodiment, the target decision module sets the target frequency to match the load driven by the voltage regulator.

In an exemplary embodiment, the target decision module controls the dynamic voltage scaler to make the reference voltage cover a corner case of the target frequency that matches the load driven by the voltage regulator.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
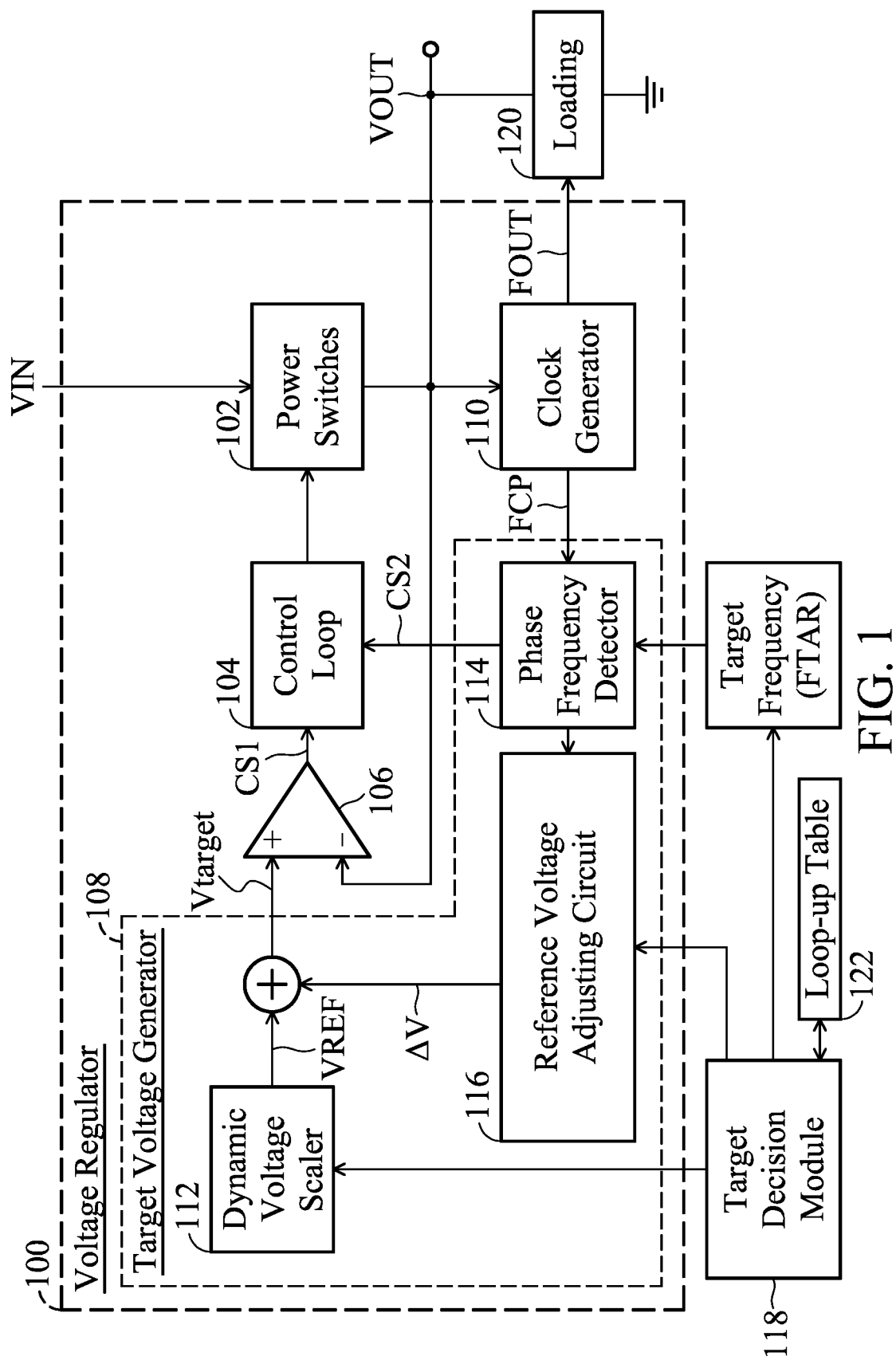
FIG. 1 depicts a voltage regulator 100 in accordance with an exemplary embodiment of the preset invention.

FIG. 1 depicts a voltage regulator 100 in accordance with an exemplary embodiment of the preset invention. The voltage regulator 100 has power switches 102 converting an input voltage VIN into an output voltage VOUT, a control loop 104, a voltage comparator 106, and a target voltage generator 108. The control loop 104 is coupled to the power switches 102 to control the power switches 102 to perform voltage regulation. The voltage comparator 106 compares the output voltage VOUT to the target voltage Vtarget to generate a first control signal CS1 to control the control loop 104. The target voltage generator 108 generates the target voltage Vtarget for the voltage comparator 106 based on the frequency difference between the target frequency FTAR and the critical-path-related frequency FCP, wherein the critical-path-related frequency FCP depends on the output voltage VOUT. In such a structure, the voltage feedback control performed through the voltage comparator 106 further takes the frequency change into consideration. The voltage regulator 100 provides the better power efficiency and the shorter response time.

In an exemplary embodiment, when the critical-path-related frequency FCP is lower than the target frequency FTAR, the target voltage generator 108 increases the target voltage Vtarget to increase the critical-path-related frequency FCP. When the critical-path-related frequency FCP is higher than the target frequency FTAR, the target voltage generator 108 decreases the target voltage Vtarget to decrease the critical-path-related frequency FCP.

The voltage regulator 100 further has a clock generator 110, which is powered by the output voltage VOUT to generate the critical-path-related frequency FCP that depends on the output voltage VOUT.

In an exemplary embodiment, the clock generator 110 makes the critical-path-related frequency FCP higher when the output voltage VOUT is higher.

The target voltage generator 108 further has a dynamic voltage scaler 112, which generates a reference voltage VREF to be adjusted according to the frequency difference between the target frequency FTAR and the critical-path-related frequency FCP. Thus, the reference voltage VREF is adjusted to the target voltage Vtarget.

The target voltage generator 108 further has a phase frequency detector 114 and a reference voltage adjusting circuit 116. The phase frequency detector 114 receives the target frequency FTAR and the critical-path-related frequency FCP to obtain the frequency difference between the target frequency FTAR and the critical-path-related frequency FCP. The reference voltage adjusting circuit 116 is controlled by the frequency difference obtained by the phase frequency detector 114. The reference voltage adjusting circuit 116 generates a correction voltage ΔV for adjusting the reference voltage VREF to the target voltage Vtarget.

There is an optional path for controlling the control loop 104 based on the between the target frequency FTAR and the critical-path-related frequency FCP. As shown, the phase frequency detector 114 further generates a second control signal CS2 for the control loop 104 based on the frequency difference between the target frequency FTAR and the critical-path-related frequency FCP. The second control signal CS2 is passed to the control loop 104 without passing through the reference voltage adjusting circuit 116 or the voltage comparator 106.

In an exemplary embodiment, the digital loop codes of the control loop 104 are adjusted according to the second control signal CS2 that is passed to the control loop 104 without passing through the reference voltage adjusting circuit 116 or the voltage comparator 106.

In an exemplary embodiment, the dynamic voltage scaler 112 is controlled by a target decision module 118 to make the reference voltage VREF match the load 120 driven by the voltage regulator 100 (driven by the output voltage VOUT or using an output clock signal FOUT).

In an exemplary embodiment, when controlling the dynamic voltage scaler 112 to make the reference voltage VREF match the load 120, the target decision module 118 further adjusts the gain that the reference voltage adjusting circuit 116 provides to amplify the frequency difference between the target frequency FTAR and the critical-path-related frequency FCP.

In an exemplary embodiment, when controlling the dynamic voltage scaler 112 to make the reference voltage VREF match the load 120, the target decision module 118 disables the gain that the reference voltage adjusting circuit 116 provides to amplify the frequency difference between the target frequency FTAR and the critical-path-related frequency FCP. The correction voltage ΔV may be zero to turn off the control based on the frequency difference between the target frequency FTAR and the critical-path-related frequency FCP.

In an exemplary embodiment, the target decision module 118 controls the dynamic voltage scaler 112 to make the reference voltage VREF related to the target frequency FTAR.

In an exemplary embodiment, the target decision module 118 sets the target frequency FTAR to match the load 120 driven by the voltage regulator 100.

In an exemplary embodiment, the target decision module 118 searches a look-up table 122 according to the target frequency FTAR to control the dynamic voltage scaler 112 according to the search result.

In an exemplary embodiment, the target decision module 118 controls the dynamic voltage scaler 112 to make the reference voltage VREF cover a corner case of the target frequency FTAR that matches the load 120.

The target decision module 118 and the look-up table 122 may be implemented by computing hardware.

Figure 2:
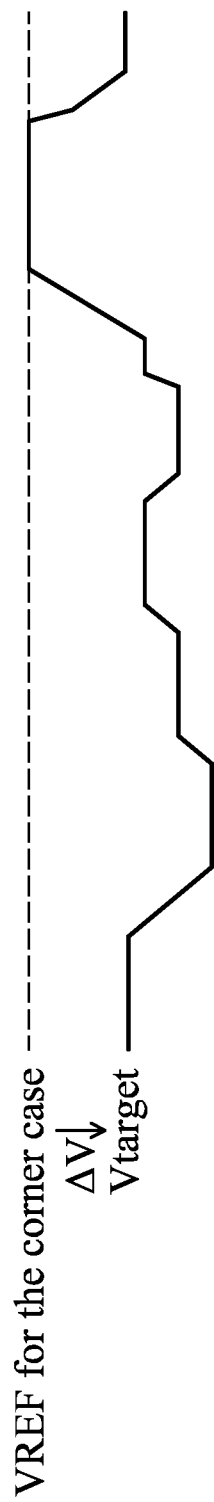
FIG. 2 shows the waveforms of the reference voltage VREF and the target voltage Vtarget in accordance with an exemplary embodiment of the present invention.

FIG. 2 shows the waveforms of the reference voltage VREF and the target voltage Vtarget in accordance with an exemplary embodiment of the present invention. The reference voltage VREF satisfies the corner case of the target frequency FTAR that matches the load 120. After being adjusted by the correction voltage ΔV that changes according to the frequency different between the target frequency FTAR and the critical-path-related frequency FCP, a more power efficient target voltage Vtarget is generated. The output voltage VOUT is adaptive to the status of the load 120.

Figure 3:
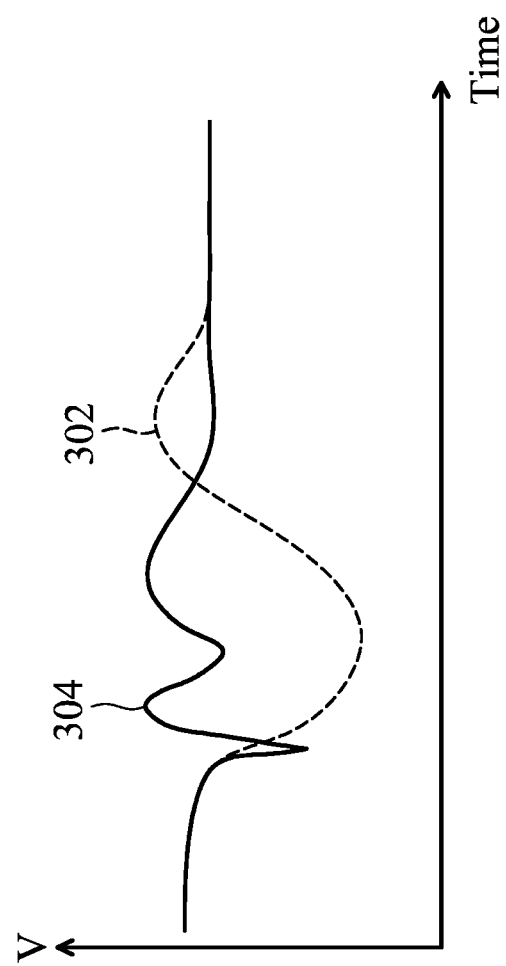
FIG. 3 shows waveforms to represent the response time of voltage regulation in accordance with an exemplary embodiment of the present invention.

FIG. 3 shows waveforms to represent the response time of voltage regulation in accordance with an exemplary embodiment of the present invention. Waveform 302 corresponds to cases where the voltage regulation is based on controlling the frequency of the output voltage to approach the target frequency, and no voltage feedback is applied. Waveform 304 corresponds to the voltage regulator 100 of FIG. 1. The transition response of the voltage regulator 100 is improved.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A voltage regulator with dynamic voltage and frequency tracking, comprising:
   power switches for voltage regulation, converting an input voltage into an output voltage;
   a control loop, coupled to the power switches to control the power switches to perform voltage regulation;
   a voltage comparator, comparing the output voltage to a target voltage to generate a first control signal to control the control loop; and
   a target voltage generator, generating the target voltage for the voltage comparator based on a frequency difference between a target frequency and a critical-path-related frequency;
   wherein:
   the critical-path-related frequency depends on the output voltage;
   when the critical-path-related frequency is lower than the target frequency, the target voltage generator increases the target voltage to increase the critical-path-related frequency; and
   when the critical-path-related frequency is higher than the target frequency, the target voltage generator decreases the target voltage to decrease the critical-path-related frequency.

2. The voltage regulator with dynamic voltage and frequency tracking as claimed in claim 1, further comprising:
   a clock generator, powered by the output voltage to generate the critical-path-related frequency that depends on the output voltage.

3. The voltage regulator with dynamic voltage and frequency tracking as claimed in claim 2, wherein:
   the clock generator makes the critical-path-related frequency higher when the output voltage is higher.

4. The voltage regulator with dynamic voltage and frequency tracking as claimed in claim 3, wherein the target voltage generator comprises:
   a dynamic voltage scaler, generating a reference voltage to be adjusted according to the frequency difference between the target frequency and the critical-path-related frequency and thereby to generate the target voltage.

5. The voltage regulator with dynamic voltage and frequency tracking as claimed in claim 4, wherein the target voltage generator further comprises:
   a phase frequency detector, receiving the target frequency and the critical-path-related frequency to obtain the frequency difference between the target frequency and the critical-path-related frequency; and
   a reference voltage adjusting circuit, controlled by the frequency difference obtained by the phase frequency detector to generate a correction voltage for adjusting the reference voltage to the target voltage.

6. The voltage regulator with dynamic voltage and frequency tracking as claimed in claim 5, wherein:
   the phase frequency detector further generates a second control signal for the control loop based on the frequency difference between the target frequency and the critical-path-related frequency, wherein the second control signal is passed to the control loop without passing through the reference voltage adjusting circuit or the voltage comparator.

7. The voltage regulator with dynamic voltage and frequency tracking as claimed in claim 6, wherein:
   according to the second control signal that is passed to the control loop without passing through the reference voltage adjusting circuit or the voltage comparator, digital loop codes of the control loop are adjusted.

8. The voltage regulator with dynamic voltage and frequency tracking as claimed in claim 5, wherein:
   the dynamic voltage scaler is controlled by a target decision module to make the reference voltage match a load driven by the voltage regulator.

9. The voltage regulator with dynamic voltage and frequency tracking as claimed in claim 8, wherein:
   when controlling the dynamic voltage scaler to make the reference voltage match the load, the target decision module further adjusts a gain that the reference voltage adjusting circuit provides to amplify the frequency difference between the target frequency and the critical-path-related frequency.

10. The voltage regulator with dynamic voltage and frequency tracking as claimed in claim 9, wherein:
    when controlling the dynamic voltage scaler to make the reference voltage match the load, the target decision module disables the gain that the reference voltage adjusting circuit provides to amplify the frequency difference between the target frequency and the critical-path-related frequency.

11. The voltage regulator with dynamic voltage and frequency tracking as claimed in claim 8, wherein:
    the target decision module controls the dynamic voltage scaler to make the reference voltage related to the target frequency.

12. The voltage regulator with dynamic voltage and frequency tracking as claimed in claim 11, wherein:
    the target decision module sets the target frequency to match the load driven by the voltage regulator.

13. The voltage regulator with dynamic voltage and frequency tracking as claimed in claim 12, wherein:
    the target decision module searches a look-up table according to the target frequency to control the dynamic voltage scaler according to the search result.

14. The voltage regulator with dynamic voltage and frequency tracking as claimed in claim 12, wherein:
    the target decision module controls the dynamic voltage scaler to make the reference voltage cover a corner case of the target frequency that matches the load driven by the voltage regulator.

* * * * *